US012012914B2

(12) United States Patent
Shinotsuka et al.

(10) Patent No.: US 12,012,914 B2
(45) Date of Patent: Jun. 18, 2024

(54) FUEL PRESSURIZATION DEVICE

(71) Applicant: MARUYAMA MFG. CO., INC., Tokyo (JP)

(72) Inventors: Koichi Shinotsuka, Tokyo (JP); Yushi Maruyama, Tokyo (JP); Toshihisa Nemoto, Tokyo (JP)

( * ) Notice: Subject to any disclaimer, the term of this patent is extended or adjusted under 35 U.S.C. 154(b) by 4 days.

(21) Appl. No.: 18/324,154

(22) Filed: May 26, 2023

(65) Prior Publication Data

US 2023/0383714 A1 Nov. 30, 2023

(30) Foreign Application Priority Data

May 30, 2022 (JP) ................................ 2022-087625

(51) Int. Cl.
*F02M 37/00* (2006.01)

(52) U.S. Cl.
CPC .... *F02M 37/0082* (2013.01); *F02M 37/0023* (2013.01)

(58) Field of Classification Search
CPC ...................... F02M 37/0023; F02M 37/0082
See application file for complete search history.

(56) References Cited

U.S. PATENT DOCUMENTS

| | | | | | |
|---|---|---|---|---|---|
| 4,660,597 | A | * | 4/1987 | Cowles | G05D 16/0666 137/505.39 |
| 4,936,267 | A | | 6/1990 | Gerhardy et al. | |
| 5,509,390 | A | * | 4/1996 | Tuckey | F02M 37/0035 123/497 |
| 6,135,429 | A | | 10/2000 | Woody | |
| 6,152,114 | A | * | 11/2000 | Kleppner | F16K 15/026 417/186 |
| 2019/0383235 | A1 | | 12/2019 | Schlecker et al. | |

FOREIGN PATENT DOCUMENTS

| | | |
|---|---|---|
| DE | 3737667 | 5/1989 |
| JP | 2019-052593 | 4/2019 |

OTHER PUBLICATIONS

Extended Search Report in corresponding European Application No. 23175339.3, dated Oct. 25, 2023.

* cited by examiner

*Primary Examiner* — Kevin A Lathers
(74) *Attorney, Agent, or Firm* — SOEI PATENT & LAW FIRM

(57) ABSTRACT

A fuel pressurization device configured to pressure-feed starting fuel to an engine. The fuel pressurization device includes a fuel chamber forming portion including a fuel chamber to which the fuel is supplied from the pump and whose internal volume is variable, and a spring configured to bias the fuel chamber forming portion so as to reduce the volume of the fuel chamber and to pressure-feed the fuel in the fuel chamber.

20 Claims, 8 Drawing Sheets

FUEL PRESSURIZATION DEVICE

CROSS-REFERENCE TO RELATED APPLICATIONS

The disclosure is based upon and claims the benefit of priority from Japanese Patent Application No. 2022-087625, filed on May 30, 2022, the entire contents of which are incorporated herein by reference.

BACKGROUND

Field

The present disclosure relates to a fuel pressurization device.

Description of the Related Art

Japanese Patent Publication No. 2019-52593 discloses an engine mounted on a brush cutter. Fuel for starting an engine is sent to a carburetor by a priming pump, and the fuel is stored in the carburetor. The fuel stored in the carburetor is sent into the engine with a negative pressure of the engine.

SUMMARY

Disclosed herein is an example fuel pressurization device. The fuel pressurization device is provided in an engine assembly including a pump, a valve, and an engine and pressure-feeds starting fuel supplied from the pump to the engine via the valve. The fuel pressurization device has a fuel chamber forming portion including a fuel chamber to which the fuel is supplied from the pump and whose internal volume is variable, and a spring configured to bias the fuel chamber forming portion such that the volume of the fuel chamber decreases.

In the fuel pressurization device, the fuel chamber forming portion is biased by the spring, and thus the fuel supplied by the pump is pressurized in the fuel chamber. For example, the valve provided in the engine assembly is closed and the fuel is being pressurized when the fuel is being supplied into the fuel chamber by the pump. In this state, when the valve provided in the engine assembly is opened to start the engine, the pressurized fuel is supplied to the engine. In this way, the fuel pressurization device may pressure-feed the fuel for starting to the engine to enhance the startability of the engine.

In some examples, the fuel chamber forming portion includes an elastically deformable elastic body in at least a part thereof, the volume of the fuel chamber changes as the elastic body deforms, and the spring (30) biases the elastic body. Accordingly, the fuel pressurization device may be able to readily change the volume of the fuel chamber using the elastic body.

In some examples, the fuel pressurization device may include an overflow channel that is connected to a discharge channel, through which the fuel sent out from the fuel chamber passes, to branch off from the discharge channel And the fuel pressurization device may include an overflow valve configured to switch between whether or not to circulate the fuel in the overflow channel Additionally, the fuel pressurization device may be able to discharge surplus fuel supplied into the fuel chamber by the pump via the overflow valve and the overflow channel.

In some examples, the overflow valve includes a valve body and a valve body spring that biases the valve body such that the flow of the fuel is cut off in the overflow channel. The fuel pressurization device adjusts a balance between the biasing forces of the spring that biases the fuel chamber forming portion and the valve body spring of the overflow valve, and thus it sets the volume of the fuel chamber. In some examples, the fuel pressurization device sets the volume of the fuel chamber by changing the balance between the biasing forces of the springs without changing the fuel chamber forming portion. The fuel pressurization device may be configured for use in these engines even in a case where the amount of the starting fuel to be pressure-fed varies depending on the type of engine or the like.

Additionally, an example fuel pressurization device for use with an engine assembly is disclosed herein. The engine assembly includes a pump, a valve, and an engine. The fuel pressurization includes a fuel chamber forming portion including a fuel chamber to which the fuel is supplied from the pump and whose internal volume is variable, and a spring configured to bias the fuel chamber forming portion such that the volume of the fuel chamber decreases. The fuel pressurization device is configured to pressure-feed the fuel from the fuel chamber to the engine via the valve of the engine assembly when starting the engine.

Additionally, an example fuel pressurization device for use with an engine assembly is disclosed herein. The fuel pressurization device configured to supply fuel to an engine, the fuel pressurization device has a main body including a discharge port, a fuel chamber located inside the main body and fluidly coupled with the discharge port, and a spring. The fuel chamber is configured to be variable in volume. The spring is configured to bias the fuel chamber so as to reduce the volume and apply pressure to the fuel in the fuel chamber when starting the engine.

Additionally, an example engine assembly is disclosed herein. The engine assembly includes an engine, and a fuel pressurization device configured to pressure-feed fuel to the engine. The fuel pressurization device includes a fuel chamber fluidly coupled with the engine and configured to be variable in volume, and a spring configured to bias the fuel chamber so as to reduce the volume and apply pressure to the fuel in the fuel chamber when starting the engine.

DETAILED DESCRIPTION

In the following description, with reference to the drawings, the same reference numbers are assigned to the same components or to similar components having the same function, and overlapping description is omitted.

Figure 1:
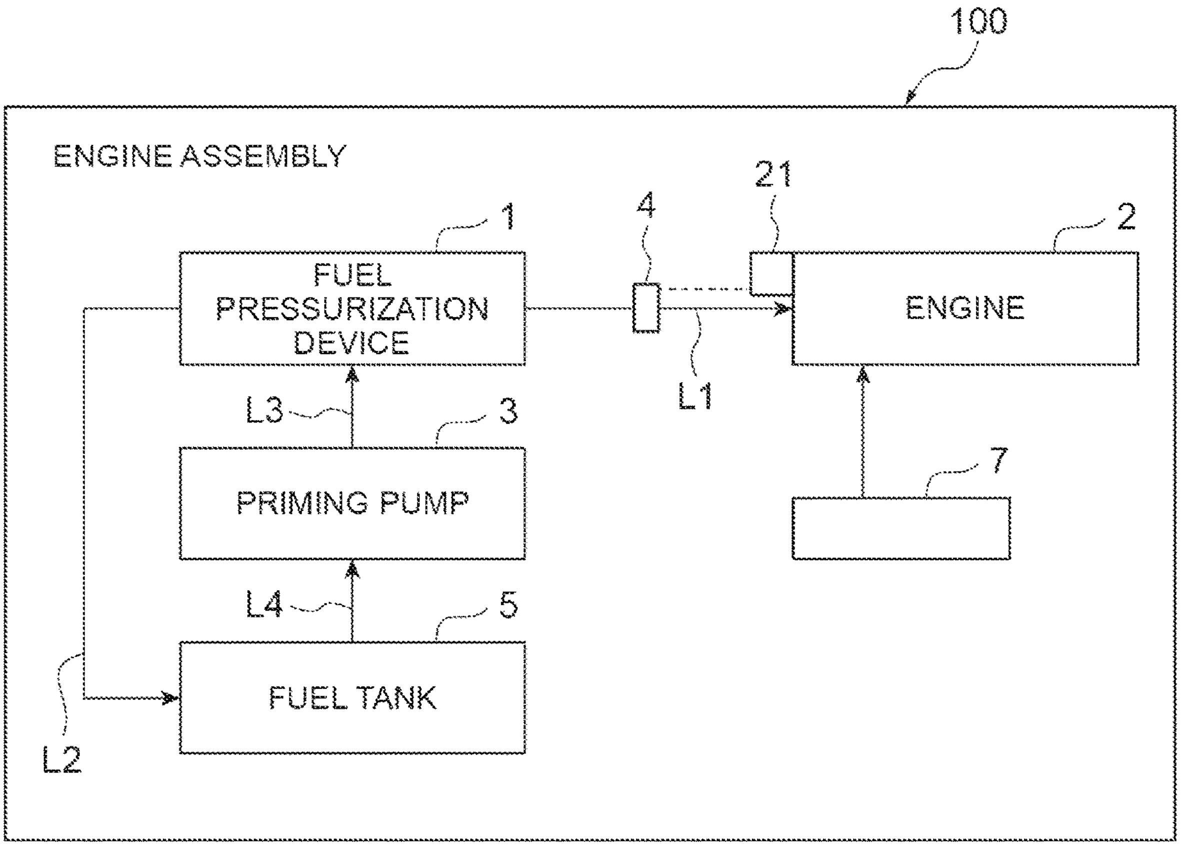
FIG. 1 is a block diagram illustrating an engine assembly provided with an example fuel pressurization device.

As shown in FIG. 1, an example fuel pressurization device 1 is provided in an engine assembly 100. The engine assembly 100 may be mounted on, as an example, a brush cutter or the like. The engine assembly 100 includes an engine 2, a priming pump (a pump) 3, and an electromagnetic valve (a valve) 4. The engine 2 may be, as an example, a two-cycle engine. Further, the engine assembly 100 may include a fuel supply device 7 for supplying fuel to the engine 2, a recoil starter 21, and the like. The fuel supply device 7 is, for example, a fuel pump or carburetor.

When the engine 2 is started, the fuel pressurization device 1 pressure-feeds starting fuel supplied from the priming pump 3 to the engine 2 (for example, the inside of a crankcase or the inside of a combustion chamber) via the electromagnetic valve 4 (e.g., fuel valve). The following description focuses on a configuration in which the fuel pressurization device 1 pressure-feeds the starting fuel.

The priming pump 3 is operated by the user of the engine assembly 100 to supply the fuel from a fuel tank 5 to the fuel pressurization device 1. Here, the priming pump 3 takes in the fuel from the fuel tank 5 via a pipe L4 and supplies the fuel to the fuel pressurization device 1 via a pipe L3.

The electromagnetic valve 4 switches between whether or not to supply the starting fuel from the fuel pressurization device 1 to the engine 2. Here, the electromagnetic valve 4 is provided in a pipe L1 (e.g., discharge pipe) for supplying the starting fuel from the fuel pressurization device 1 to the engine 2. The electromagnetic valve 4 is switched between an open state in which the fuel can circulate through the pipe L1 and a closed state in which the flow of the fuel through the pipe L1 is cut off. The electromagnetic valve 4 is switched from the closed state to the open state when the engine 2 is started. For example, the electromagnetic valve 4 may be switched from the closed state to the open state in conjunction with the operation of a recoil starter that is operated when the engine 2 is started.

Figure 2:
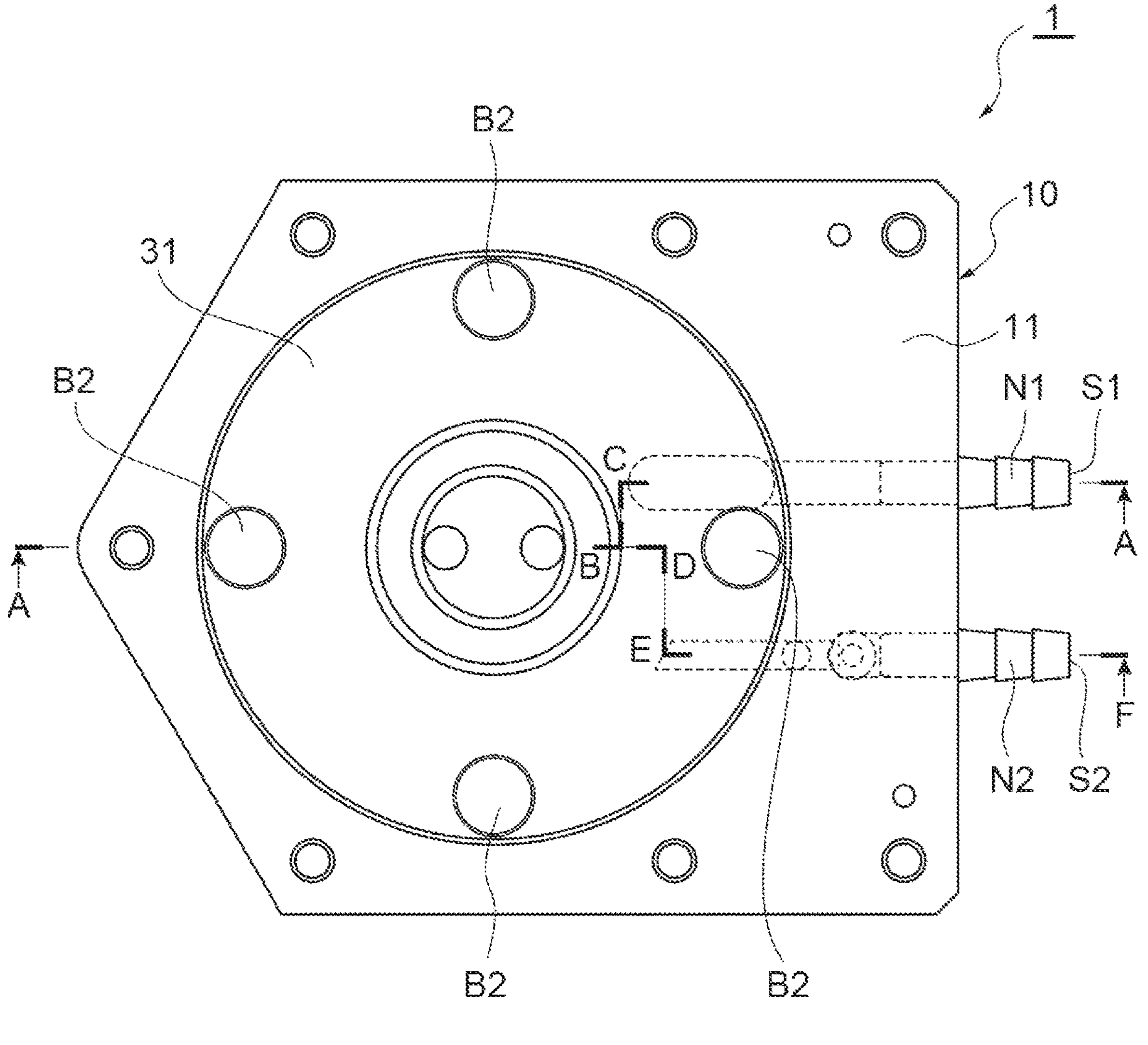
FIG. 2 is a front view of an example fuel pressurization device.
Figure 3:
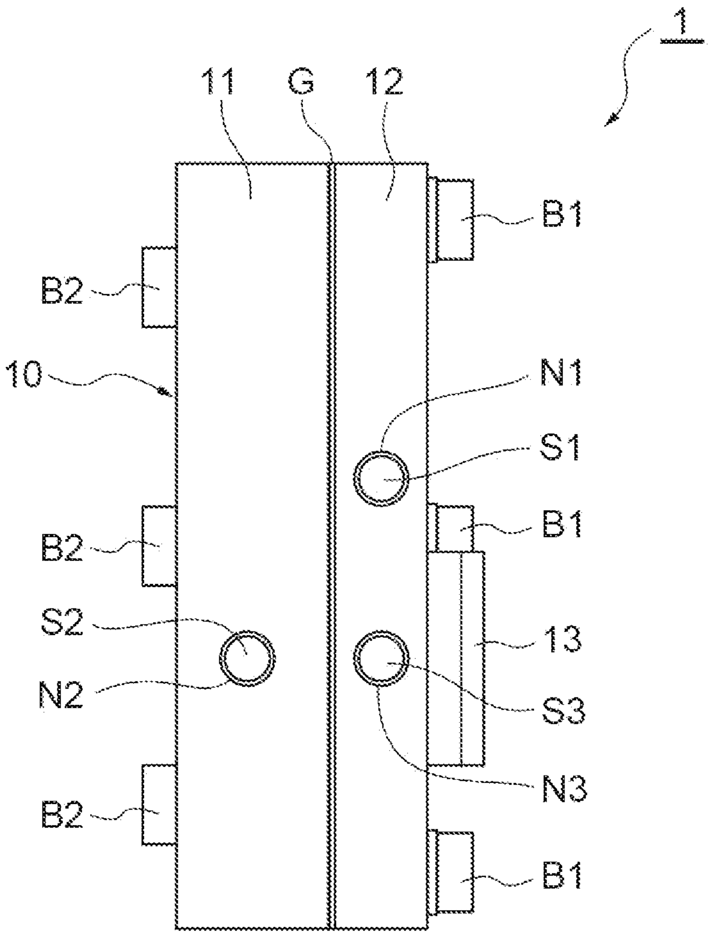
FIG. 3 is a side view of an example fuel pressurization device viewed from an intake port side.

As shown in FIGS. 2 and 3, the fuel pressurization device 1 takes in the fuel supplied from the priming pump 3 through an intake port S1. Then, the fuel pressurization device 1 discharges the taken-in fuel from a discharge port S2 and pressure-feeds the fuel to the engine 2. Further, the fuel pressurization device 1 has an overflow outlet port S3. The overflow outlet port S3 discharges surplus of the taken-in fuel to the outside. A nipple N1, a nipple N2, and a nipple N3 are attached to the intake port S1, the discharge port S2, and the overflow outlet port S3, respectively. The pipe L3 (see FIG. 1) is connected to the nipple N1. The pipe L1 (see FIG. 1) is connected to the nipple N2. The pipe L2 (see FIG. 1) is connected to the nipple N3. The pipe L2 serves as a flow channel for returning the surplus fuel discharged from the fuel pressurization device 1 to the fuel tank 5.

Figure 4:
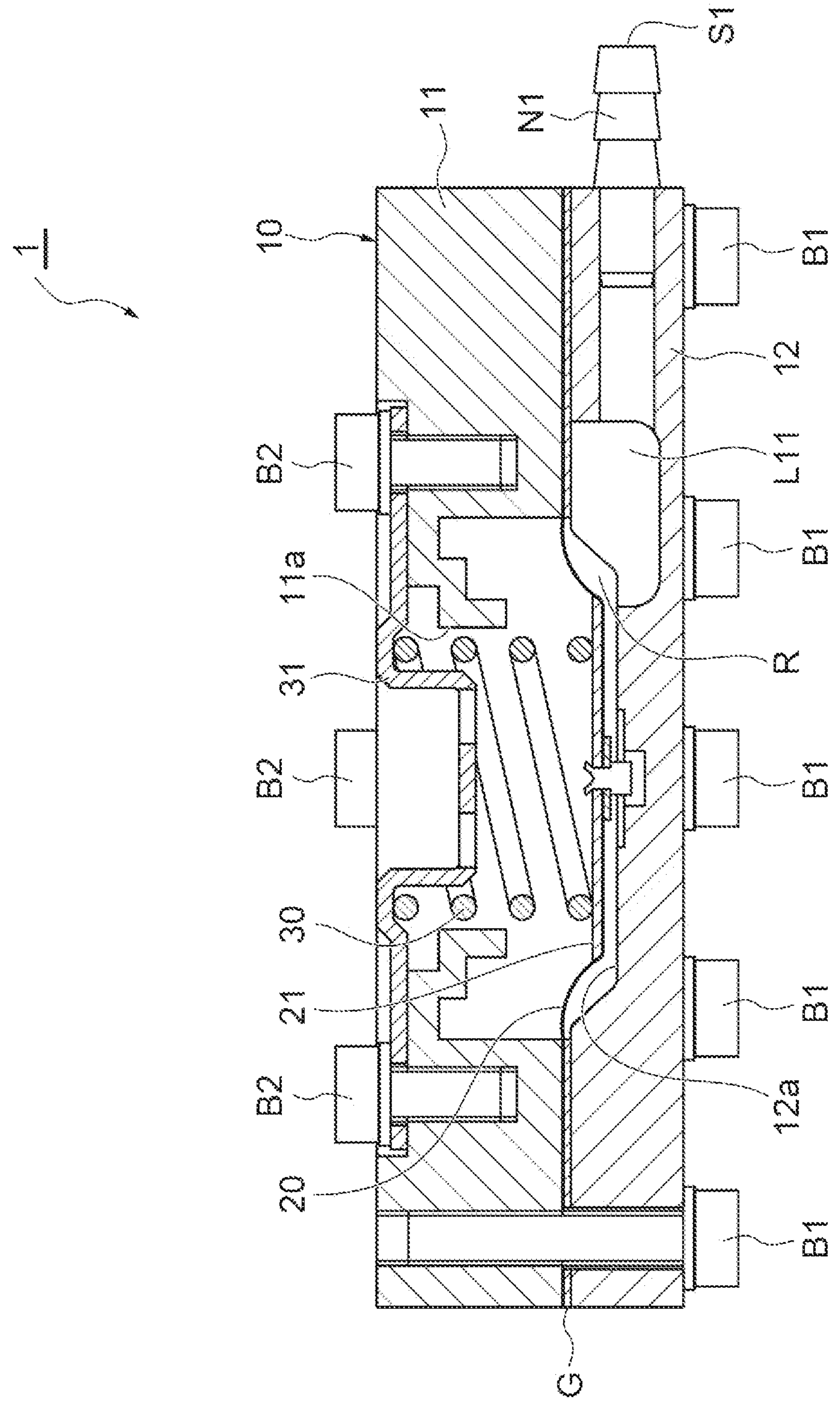
FIG. 4 is a cross-sectional view along line A-B-C-A of FIG. 2.
Figure 5:
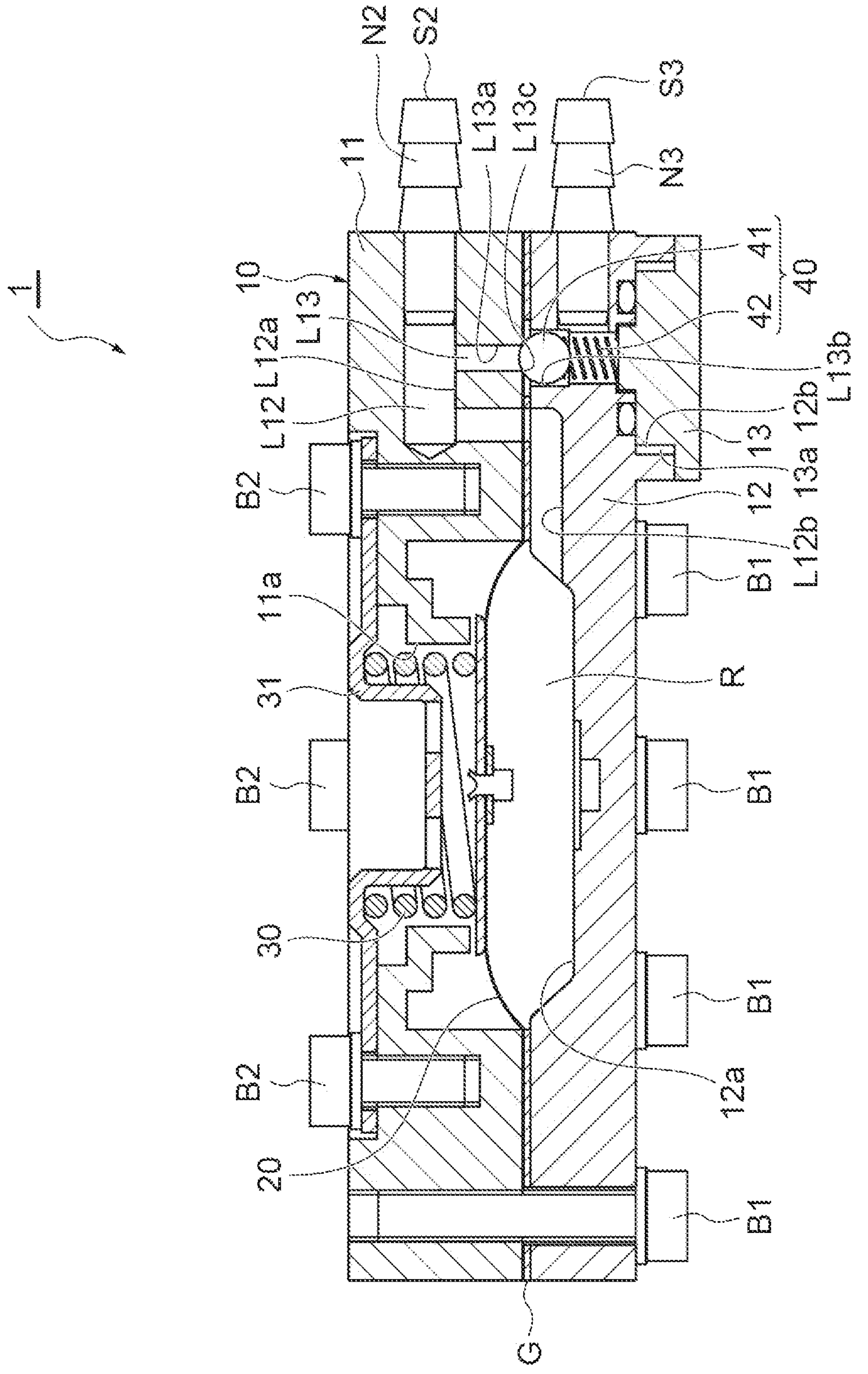
FIG. 5 is a cross-sectional view along line A-D-E-F in FIG. 2.

As shown in FIGS. 4 and 5, the fuel pressurization device 1 includes a main body 10, an elastic body 20, a spring 30, and an overflow valve 40 (see FIG. 5). The main body 10 includes a first main body portion 11 and a second main body portion 12. Each of the first main body portion 11 and the second main body portion 12 has a substantially plate shape. The first main body portion 11 and the second main body portion 12 are overlapped each other with a gasket G interposed therebetween and are fixed to each other with a screw B1. The first main body portion 11 is provided with the discharge port S2. The second main body portion 12 is provided with the intake port S1 and the overflow outlet port S3.

The first main body portion 11 is provided with a hole 11*a* penetrating in the overlapping direction of the first main body portion 11 and the second main body portion 12. The second main body portion 12 is provided with a recess 12*a* in a portion facing the hole 11*a* of the first main body portion 11.

The elastic body 20 is disposed to cover the recess 12*a* of the second main body portion 12. The elastic body 20 is fixed by the edge of the elastic body 20 together with the gasket G being sandwiched between the first main body portion 11 and the second main body portion 12. The elastic body 20 is an elastically deformable member. For example, the elastic body 20 is made of rubber or the like. The elastic body 20 is sheet-like.

Here, the fuel is supplied from the priming pump 3 to a space between the second main body portion 12 and the elastic body 20. The space between the wall surface of the recess 12*a* of the second main body portion 12 and the elastic body 20 serves as a fuel chamber R to which the fuel is supplied. For example, the fuel chamber R includes the elastic body 20 and the recess 12*a* of the second main body portion 12. Moreover, as described above, the elastic body 20 is elastically deformable. Therefore, the volume of the fuel chamber R changes as the elastic body 20 deforms (see a difference between the fuel chambers R in FIGS. 4 and 5).

FIG. 4 shows a state in which no fuel is being supplied into the fuel chamber R. Further, FIG. 5 shows a state in which the fuel is being supplied into the fuel chamber R, the spring 30 is compressed, and the volume of the fuel chamber R becomes larger than the state shown in FIG. 4. In this way, the second main body portion 12 and the elastic body 20 constitute a fuel chamber forming portion including the fuel chamber R to which the fuel is supplied from the priming pump 3 and whose internal volume is variable.

As shown in FIG. 4, the spring 30 is located between the first main body portion 11 and the elastic body 20. The spring 30 is disposed in the hole 11*a* of the first main body portion 11. The spring 30 is a compression spring. A substantially plate-like spring retainer 31 is attached to the outer surface of the first main body portion 11 with a screw B2. The spring retainer 31 covers the hole 11*a* of the first main body portion 11. One end portion of the spring 30 is in contact with the elastic body 20, and the other end portion of the spring 30 is in contact with the spring retainer 31. That is, the spring 30 biases the elastic body 20 toward the second main body portion 12 such that the volume of the fuel chamber R decreases. In this way, the spring 30 applies a pressure to the fuel in the fuel chamber R in a state where the fuel is being supplied into the fuel chamber R as shown in FIG. 5. A spring pad 21 attached to the elastic body 20 may be provided between the elastic body 20 and the spring 30. The spring 30 biases the elastic body 20 so as to reduce the volume of the fuel chamber R. The spring 30 pressure-feeds the fuel in the fuel chamber R to the discharge port S2.

Further, as shown in FIGS. 4 and 5, the main body 10 is provided with an inflow channel L11, a discharge channel L12, and an overflow channel L13. As shown in FIG. 4, the inflow channel L11 connects the intake port S1 and the fuel chamber R to each other. For example, the inflow channel L11 is formed by a groove and a hole provided in the first main body portion 11. The inflow channel L11 guides the fuel supplied from the priming pump 3 to the intake port S1 via the pipe L3 to the fuel chamber R.

As shown in FIG. 5, the discharge channel L12 connects the fuel chamber R and the discharge port S2 to each other. The discharge channel L12 includes a first part L12*a* provided in the first main body portion 11 and a second part L12*b* provided in the second main body portion 12. The first part L12*a* and the second part L12*b* are formed by grooves or holes. The first part L12*a* is fluidly coupled with the discharge port S2. The second part L12*b* is fluidly coupled with the fuel chamber R and the first part L12*a*. The discharge channel L12 guides the fuel sent out from the fuel chamber R to the discharge port S2. That is, the fuel sent out from the fuel chamber R passes through the discharge channel L12.

The overflow channel L13 connects the discharge channel L12 and the overflow outlet port S3 to each other. That is, the overflow channel L13 has one end portion connected to the discharge channel L12 to branch off from the discharge passage L12 and the other end portion connected to the overflow outlet port S3. The overflow channel L13 is formed by a hole provided in the first main body portion 11 and a hole provided in the second main body portion 12.

The overflow valve 40 is provided in the overflow channel L13 and switches between whether or not to circulate the fuel in the overflow channel L13. The overflow valve 40 is switched between an open state in which the fuel can circulate through the overflow channel L13 and a closed state in which the flow of the fuel through the overflow channel L13 is cut off, depending on the pressure of the fuel in the fuel chamber R.

The overflow channel L13 includes a small-diameter flow channel portion L13*a* connected to the discharge channel L12 and a large-diameter flow channel portion L13*b* connected to the small-diameter flow channel portion L13*a*. The large-diameter flow channel portion L13*b* has a larger flow channel cross-sectional area than the small-diameter flow channel portion L13*a*. In addition, the small-diameter flow channel portion L13*a* is positioned closer to the discharge channel L12 than the large-diameter flow channel portion L13*b*. The small-diameter flow channel portion L13*a* is provided in the first main body portion 11, and the large-diameter flow channel portion L13*b* is provided in the second main body portion 12. The overflow valve 40 opens and closes an opening portion L13*c* of the small-diameter flow channel portion L13*a* at a connection portion between the small-diameter flow channel portion L13*a* and the large-diameter flow channel portion L13*b* to switch between whether or not to circulate the fuel in the overflow channel L13.

The small-diameter flow channel portion L13*a* is an example of a first part of the overflow channel L13. The large-diameter flow channel portion L13*b* is an example of a second part of the overflow channel L13. The small-diameter flow channel portion L13*a* is fluidly coupled with the first part L12*a* of the discharge channel L12. The large-diameter flow channel portion L13*b* is fluidly coupled with the small-diameter flow channel portion L13*a* and the overflow outlet port S3.

The overflow valve 40 controls a flow of the fuel into the overflow channel L13 based on a pressure in the discharge channel L12. The overflow valve 40 includes a valve body 41 and a spring (a valve body spring) 42. The valve body 41 is provided in the large-diameter flow channel portion L13*b* and opens and closes the opening portion L13*c* of the small-diameter flow channel portion L13*a*. The spring 42 is a compression spring. The spring 42 biases the valve body 41 to cut off the flow of the fuel in the overflow channel L13. Here, the spring 42 biases the valve body 41 such that the opening portion L13*c* of the small-diameter flow channel portion L13*a* is cut off by the valve body 41. One end portion of the spring 42 is in contact with the valve body 41, and the other end portion thereof is in contact with a spring retainer 13 provided in the second main body portion 12. The spring retainer 13 is attached to the second main body portion 12 with an O-ring interposed therebetween. As an example, a male screw portion 13*a* is provided on the outer peripheral surface of the spring retainer 13. A female screw portion 12*b* is provided on the inner peripheral surface of a hole portion in the second main body portion 12 into which the spring retainer 13 is fitted. The spring retainer 13 is attached to the second main body portion 12 by the male screw portion 13*a* engaging with the female screw portion 12*b* of the second main body portion 12.

In the overflow valve 40, the spring 42 is compressed when the pressure of the fuel in the fuel chamber R becomes a predetermined pressure or more, and the valve body 41 separates from the opening portion L13*c* of the small-diameter flow channel portion L13*a*. As a result, the opening portion L13*c* is opened, and the fuel can circulate through the overflow channel L13. In this case, the fuel in the fuel chamber R (surplus fuel) is returned from the fuel pressurization device 1 to the fuel tank 5 via the pipe L2 by being able to circulate through the overflow channel L13.

Next, the operation of the fuel pressurization device 1 for pressure-feeding the starting fuel to the engine 2 when starting the engine 2 will be described. It is assumed that the electromagnetic valve 4 is closed before the engine 2 is started. First, the user of the engine assembly 100 operates (presses) the priming pump 3 to start the engine 2. As a result, the fuel in the fuel tank 5 is sent to the intake port S1 of the fuel pressurization device 1 via the pipe L4, the priming pump 3, and the pipe L3, and the fuel is sent from the intake port S1 into the fuel chamber R via the inflow channel L11.

Figure 6:
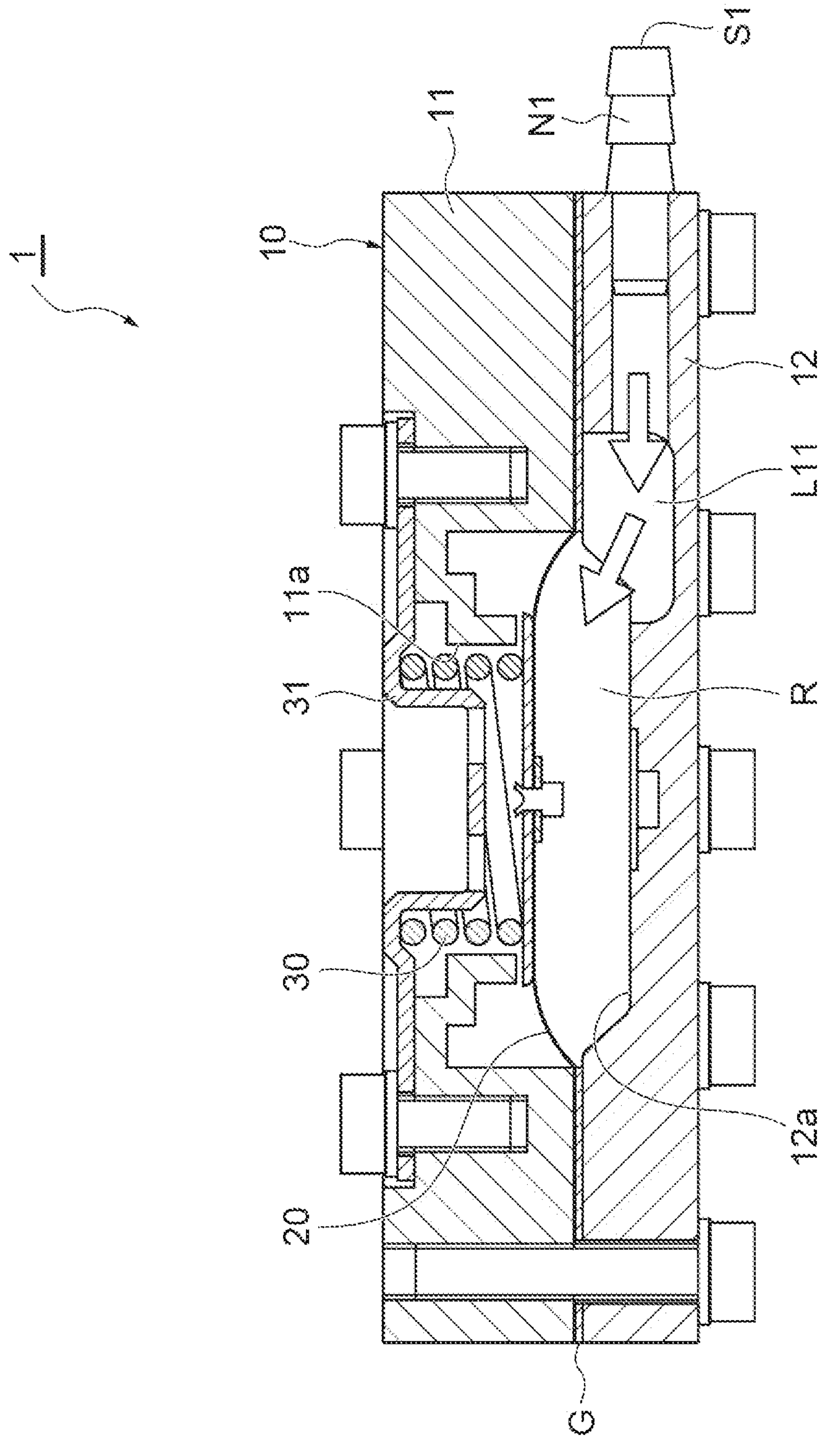
FIG. 6 is a cross-sectional view along line A-B-C-A in FIG. 2, illustrating how fuel is supplied into a fuel chamber.

When the user further operates the priming pump 3 to send the fuel to the fuel pressurization device 1, as shown in FIG. 6, the fuel sent into the fuel chamber R resists a biasing force of the spring 30 to push up the elastic body 20 (to move the elastic body 20 in a direction in which the spring 30 is compressed). As a result, the volume of the fuel chamber R increases, and the inside of the fuel chamber R is filled with the fuel. In this state, the fuel in the fuel chamber R is not sent to the engine 2 because the electromagnetic valve 4 is closed. That is, the fuel pressurization device 1 can store the fuel in the fuel chamber R. Further, the fuel stored in the fuel chamber R is biased by the spring 30 via the elastic body 20 and is in a pressurized state.

Figure 7:
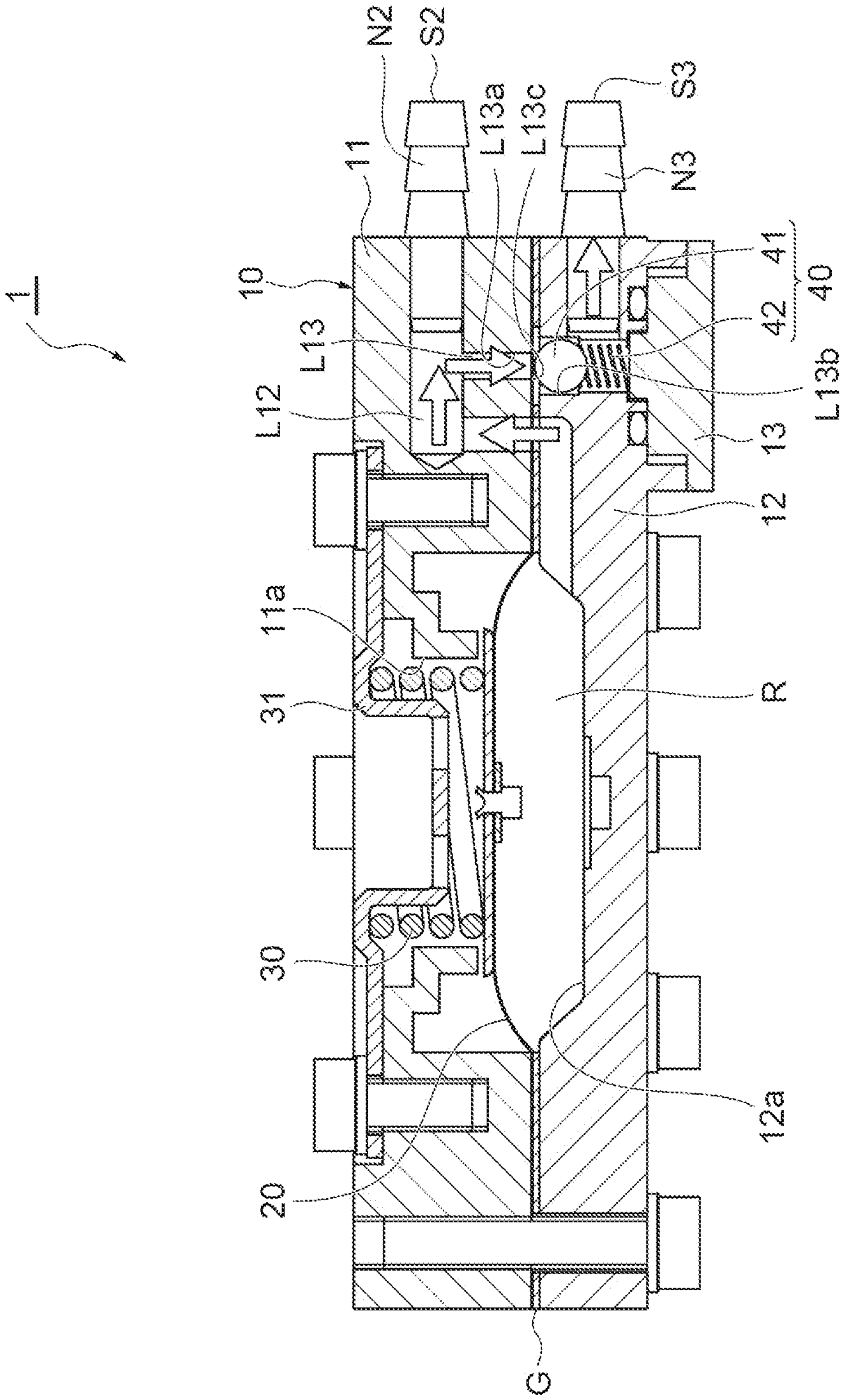
FIG. 7 is a cross-sectional view along line A-D-E-F in FIG. 2, illustrating how the fuel supplied to the fuel chamber is discharged from an overflow channel.

When the user further operates the priming pump 3 to send the fuel to the fuel pressurization device 1, as shown in FIG. 7, the fuel sent to the fuel chamber R biases the valve body 41 of the overflow valve 40 via the discharge channel L12 and the overflow channel L13 (the small-diameter flow channel portion L13*a*). The spring 42 is set such that it starts to contract at a pressure higher than the pressure of the fuel in the fuel chamber R accumulated by the spring 30 by a predetermined value. That is, the spring 42 starts to contract after the spring 30 has contracted. When the valve body 41 is biased by the fuel and the spring 42 is compressed, the valve body 41 separates from the opening portion L13*c* of the small-diameter flow channel portion L13*a*. As a result, the opening portion L13*c* is opened, and the fuel can circulate through the overflow channel L13. In this state, the fuel is returned to the fuel tank 5 from the overflow channel L13 via the overflow outlet port S3 and the pipe L2. That is, the surplus fuel in the fuel chamber R is returned to the fuel tank 5 via the overflow channel L13, and the fuel in the fuel chamber R can be maintained at a predetermined pressure.

After the fuel is stored in the fuel chamber R, the user starts the engine 2 by operating a recoil starter, for example.

Figure 8:
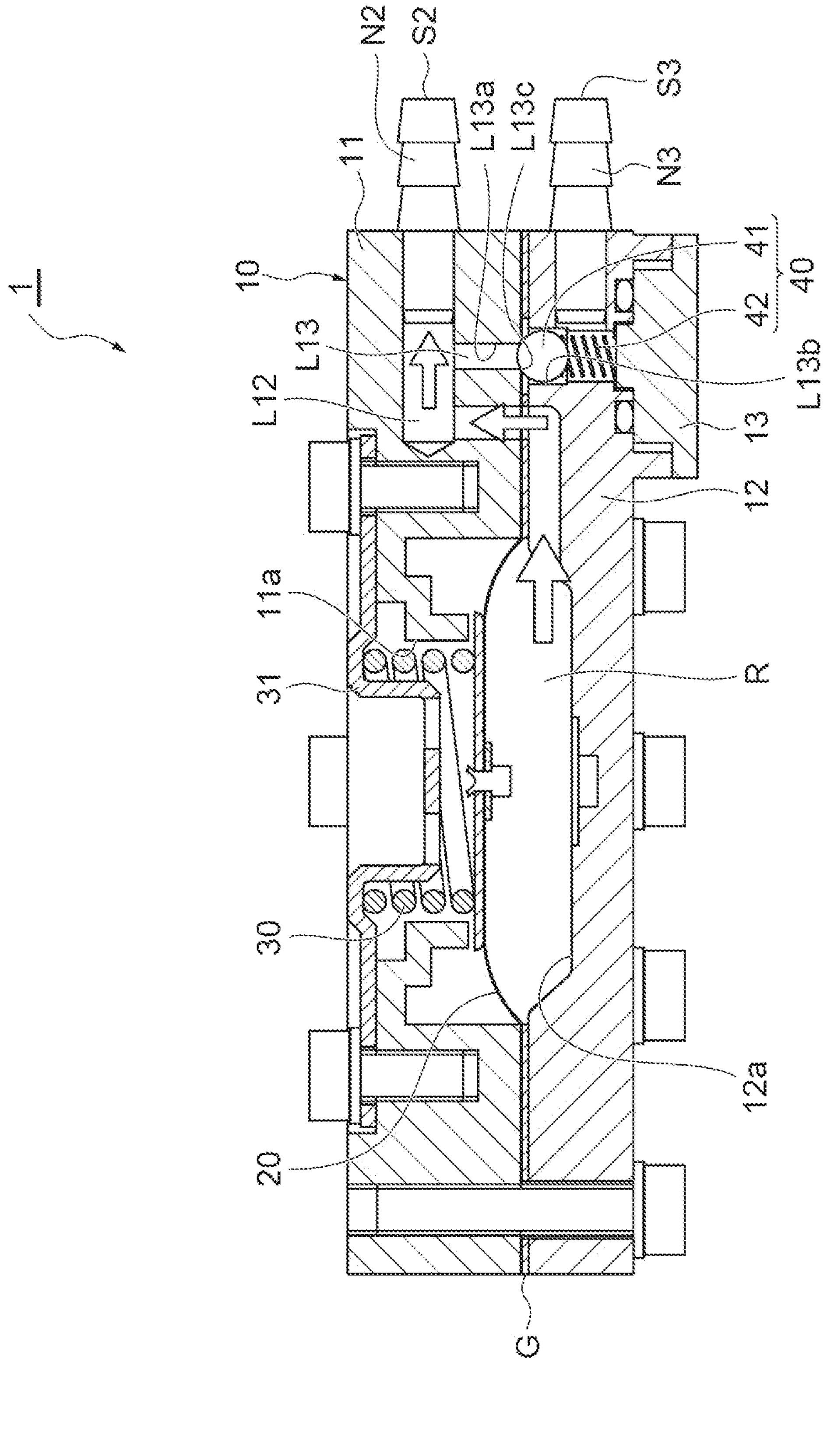
FIG. 8 is a cross-sectional view along line A-D-E-F in FIG. 2, illustrating how the fuel in the fuel chamber is supplied to the engine via a discharge channel.

The electromagnetic valve 4 is changed from the closed state to the open state in conjunction with the operation of starting the engine 2. As a result, as shown in FIG. 8, the starting fuel in the fuel chamber R pressurized by the spring 30 is vigorously sent (pressure-fed) to the engine 2 at once via the discharge channel L12 and the pipe L1. In this way, since the starting fuel is supplied at once when the engine 2 is started, startability of the engine 2 is improved.

As described above, in the fuel pressurization device 1, the elastic body 20 is biased by the spring 30, and thus the fuel supplied by the priming pump 3 is pressurized in the fuel chamber R. In pressuring the fuel, when the fuel is being supplied into the fuel chamber R by the priming pump 3, the electromagnetic valve 4 provided in the engine assembly 100 is closed. In this state, when the electromagnetic valve 4 provided in the engine assembly 100 is opened to start the engine 2, the pressurized fuel is vigorously supplied to the engine 2 at once. In this way, the fuel pressurization device 1 can pressure-feed the fuel for starting to the engine 2 to enhance the startability of the engine 2.

The fuel chamber R includes the elastically deformable elastic body 20 in at least a part thereof. In this case, the fuel pressurization device 1 can readily change the volume of the fuel chamber R using the elastic body 20.

The fuel pressurization device 1 includes the overflow channel L13 that branches off from the discharge channel L12 and the overflow valve 40 that switches between whether or not to circulate the fuel in the overflow channel L13. In this case, the fuel pressurization device 1 can discharge the surplus fuel supplied into the fuel chamber R by the priming pump 3 via the overflow valve 40 and the overflow channel L13.

The overflow valve 40 includes the valve body 41 and the spring 42 that biases the valve body 41. In this case, the fuel pressurization device 1 adjusts a balance between the biasing forces of the spring 30 that biases the elastic body 20 and the spring 42 of the overflow valve 40, and thus it sets the volume of the fuel chamber R. In some examples, the fuel pressurization device 1 sets the volume of the fuel chamber R to a desired value by changing the balance between the biasing forces of the springs 30 and 42 without changing the second main body portion 12 (the recess 12*a*) and the elastic body 20. As a result, the fuel pressurization device 1 can be configured for use with these engines 2 even in a case where the amount of the starting fuel to be pressure-fed varies depending on the type of engine 2 or the like.

It is to be understood that not all aspects, advantages and features described herein may necessarily be achieved by, or included in, any one particular example. Indeed, having described and illustrated various examples herein, it should be apparent that other examples may be modified in arrangement and detail.

For example, the pump for sending the fuel to the fuel chamber R is not limited to the priming pump 3. Other types of pumps may be used for sending the fuel to the fuel chamber R of the fuel pressurization device 1. Further, in addition to the electromagnetic valve 4 described herein, other types of valves providing similar functionality may be used.

What is claimed is:

1. A fuel pressurization device for use with an engine assembly including a pump, a valve, and an engine, the fuel pressurization device comprising:

a fuel chamber to which fuel is supplied from the pump and including an elastically deformable elastic body that forms one side of the fuel chamber, wherein an internal volume of the fuel chamber is variable as the elastic body deforms;

a spring configured to bias the elastic body such that the internal volume of the fuel chamber decreases;

a main body including a first main body portion that houses the spring and a second main body portion forming an opposite side of the fuel chamber, wherein the first main body portion includes a discharge port fluidly coupled to the fuel chamber, and wherein the fuel pressurization device is configured to pressure-feed the fuel from the fuel chamber to the engine via the valve of the engine assembly when starting the engine.

2. The fuel pressurization device according to claim 1, further comprising an intake port attached to the second main body portion and fluidly coupled to the fuel chamber.

3. The fuel pressurization device according to claim 1, wherein the elastic body is sheet-like, and wherein the elastic body is located between the main body portion and the second main body portion.

4. The fuel pressurization device according to claim 1, further comprising:

a discharge channel fluidly coupling the discharge port to the fuel chamber for pressure-feeding the fuel to the engine;

an overflow channel fluidly coupled to the discharge channel and providing a branched off path from the discharge channel; and an overflow outlet port attached to the second main body portion and fluidly coupled to the overflow channel.

5. The fuel pressurization device according to claim 4, further comprising an overflow valve configured to control a flow of the fuel into the overflow channel based on a pressure in the discharge channel, wherein the overflow channel comprises:

a first part located in the main body portion; and a second part located in the second main body portion, and wherein the overflow valve is located in the second part of the overflow channel.

6. The fuel pressurization device according to claim 5, wherein the overflow valve includes a valve body and a valve body spring that biases the valve body such that the flow of the fuel is cut off into the overflow channel.

7. A fuel pressurization device configured to supply fuel to an engine, the fuel pressurization device comprising:

a main body including:

a first main body portion;

a discharge port attached to the first main body portion; and a second main body portion forming a recess;

a fuel chamber partially located inside the recess of the second main body portion and fluidly coupled with the discharge port, wherein the fuel chamber is configured to be variable in volume; and a spring housed in the first main body portion and configured to bias the fuel chamber so as to reduce the volume and apply pressure to the fuel in the fuel chamber when starting the engine.

8. The fuel pressurization device according to claim 7, wherein the main body further comprises an elastic body located between the first main body portion and the second main body portion, wherein the fuel chamber is formed between the elastic body and the recess of the second main body portion.

9. The fuel pressurization device according to claim 8, wherein the spring is located between the elastic body and the first main body portion.

10. The fuel pressurization device according to claim 7, wherein the first main body portion includes a first part of a discharge channel fluidly coupled with the discharge port, and wherein the second main body portion includes a second part of the discharge channel fluidly coupled with the first part of the discharge channel and the fuel chamber.

11. The fuel pressurization device according to claim 10, wherein the first main body portion includes a first part of an overflow channel fluidly coupled with the first part of the discharge channel, and wherein the second main body portion includes an overflow port, and a second part of the overflow channel fluidly coupled with the first part of the overflow channel and the overflow port.

12. The fuel pressurization device according to claim 11, further comprising an overflow valve located on the second part of the overflow channel and configured to cut that a flow of the fuel in the second part of the overflow channel.

13. The fuel pressurization device according to claim 11, wherein the second main body portion including an intake port fluidly coupled with the fuel chamber, and wherein the second part of the overflow channel has a larger flow channel cross-section area than the first part of the overflow channel.

14. The fuel pressurization device according to claim 7, wherein the main body comprises:

a discharge channel fluidly coupled with the discharge port and the fuel chamber;

an overflow channel fluidly coupled with the discharge channel; and an overflow valve configured to cut off a flow of the fuel in the overflow channel, and wherein the second main body portion includes an overflow port fluidly coupled to the overflow channel.

15. The fuel pressurization device according to claim 14, wherein the first main body portion includes a first part of the overflow channel fluidly coupled with the discharge channel, wherein the second main body portion further includes a second part of the overflow channel fluidly coupled with the first part of the overflow channel and the overflow port, and wherein the overflow valve includes a valve body located on the second part of the overflow channel and a valve body spring that biases the valve body such that a flow of the fuel is cut off in the overflow channel.

16. An engine assembly comprising:

an engine; and a fuel pressurization device configured to pressure-feed fuel to the engine, wherein the fuel pressurization device comprises:

a fuel chamber fluidly coupled with the engine and including an elastically deformable elastic body, wherein a volume of the fuel chamber changes as the elastic body deforms;

a spring configured to bias the elastic body so as to reduce the volume and apply pressure to the fuel in the fuel chamber when starting the engine; and a main body including a first main body portion that houses the spring and a second main body portion that forms a recess, wherein the fuel chamber is formed between the elastic body and the recess of the second main body portion, and wherein the first main body portion includes a discharge port fluidly coupled to the fuel chamber.

17. The engine assembly according to claim 16, wherein the first main body portion includes a first part of a discharge channel fluidly coupled to the discharge port, and wherein the second main body portion includes a second part of the discharge channel fluidly coupled the first part of the discharge channel and the fuel chamber.

18. The engine assembly according to claim 17, wherein the first main body portion includes a first part of an overflow channel fluidly coupled to the first part of the discharge channel, and wherein the second main body portion includes a second part of the overflow channel fluidly coupled to the first part of an overflow channel, and an overflow port fluidly coupled to the second part of the overflow channel.

19. The engine assembly according to claim 16, further comprising a gasket configured to seal the fuel chamber, wherein a portion of the elastic body extends outside of the recess, and wherein the portion of the elastic body and the gasket are sandwiched together between the first main body portion and the second main body portion.

20. The engine assembly according to claim 19, wherein the portion of the elastic body is located between the gasket and the first main body portion.

* * * * *